Jan. 31, 1961   W. A. CASTINE, JR., ET AL   2,969,624
EDGE SEAMING APPARATUS
Filed Dec. 16, 1958   3 Sheets-Sheet 1

INVENTORS
WILLIAM A. CASTINE JR.
DALE R. BUCKLES and
BY JOHN R. DAHLBERG

Oscar L. Spencer
ATTORNEY

Jan. 31, 1961   W. A. CASTINE, JR., ET AL   2,969,624
EDGE SEAMING APPARATUS
Filed Dec. 16, 1958   3 Sheets-Sheet 2
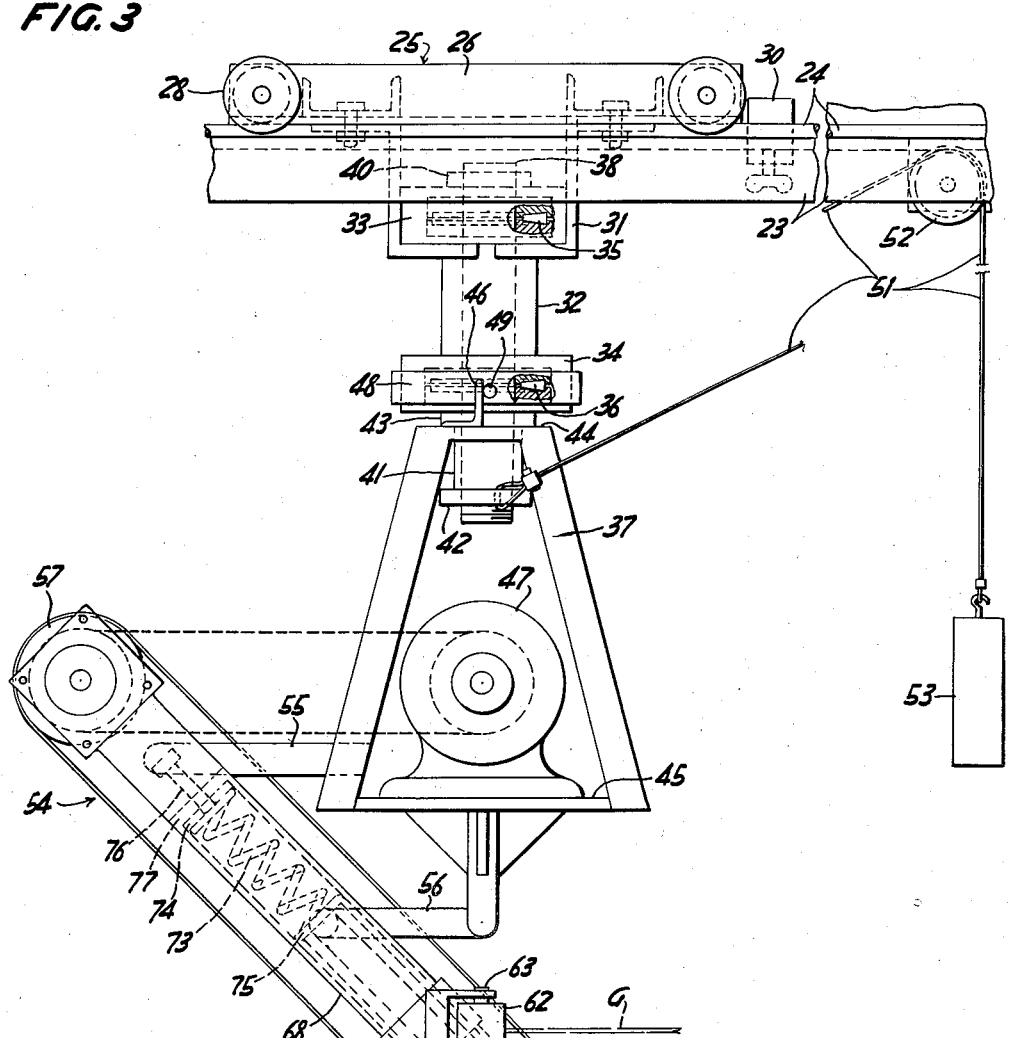
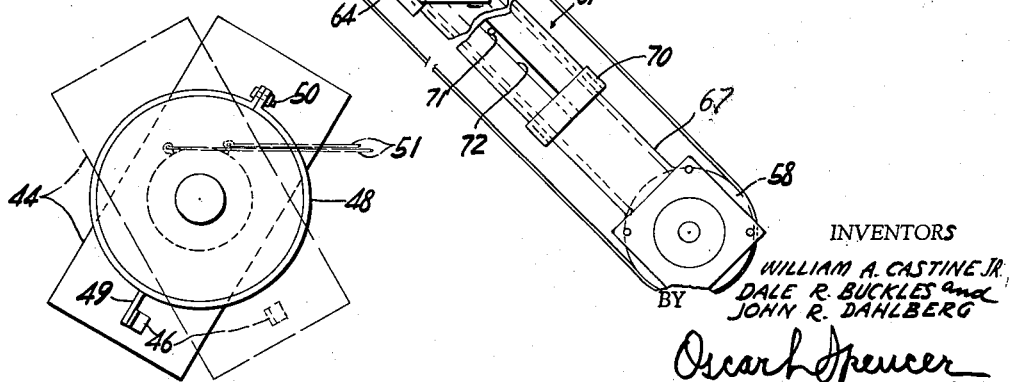
INVENTORS
WILLIAM A. CASTINE JR.
DALE R. BUCKLES and
JOHN R. DAHLBERG
BY Oscar L. Spencer
ATTORNEY

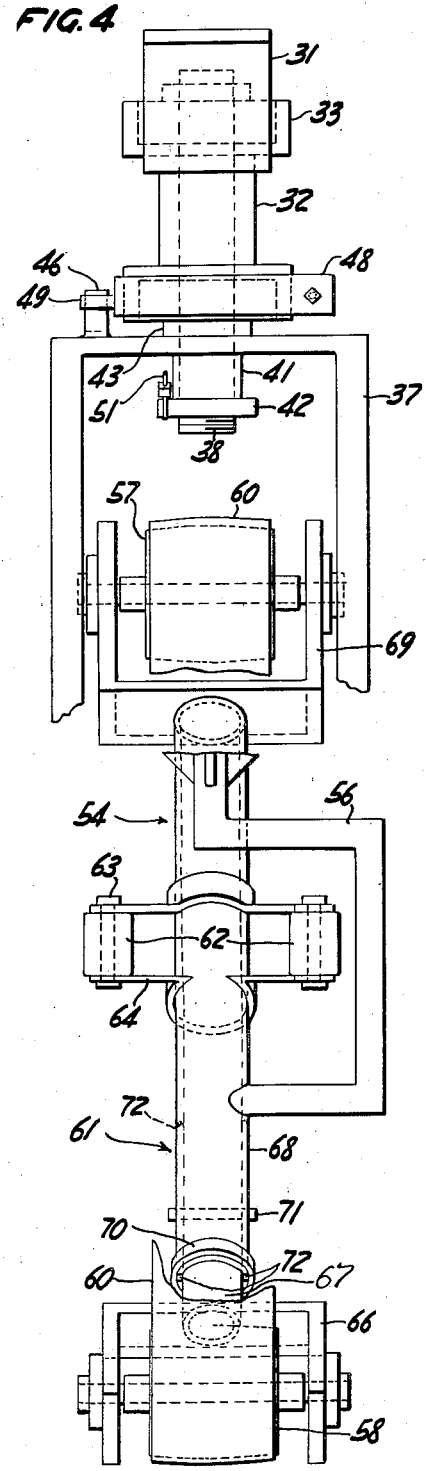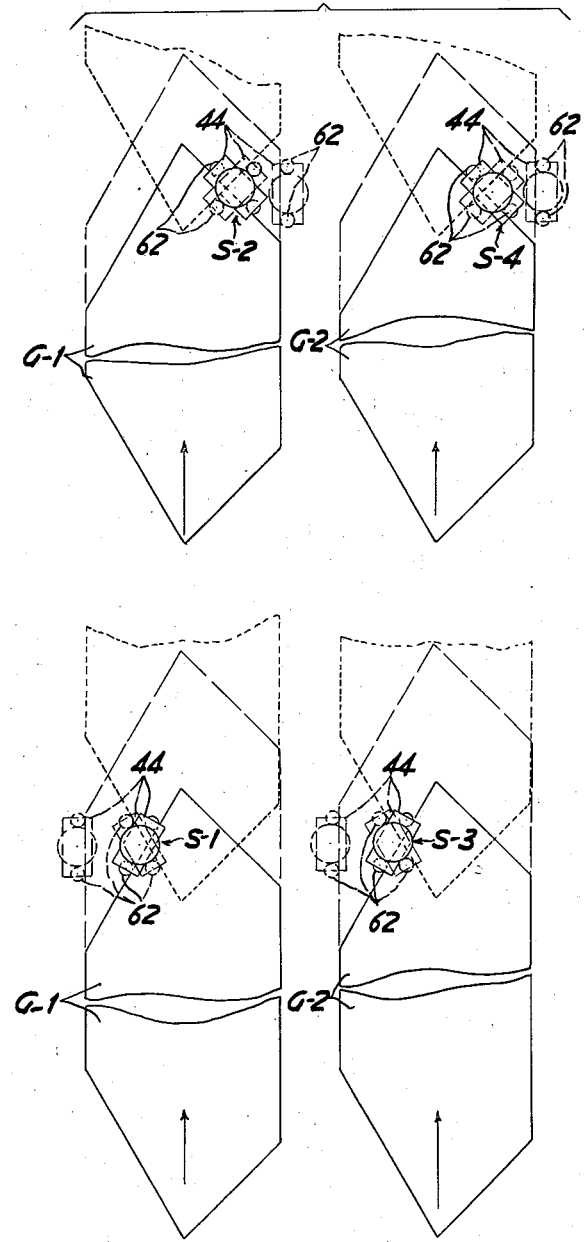

United States Patent Office 2,969,624
Patented Jan. 31, 1961

2,969,624

EDGE SEAMING APPARATUS

William A. Castine, Jr., Jeannette, Dale R. Buckles, Natrona Heights, and John R. Dahlberg, Greensburg, Pa., assignors to Pittsburgh Plate Glass Company, county of Allegheny, Pa.

Filed Dec. 16, 1958, Ser. No. 780,735

7 Claims. (Cl. 51—137)

This invention relates to edge seaming of glass sheets and more specifically to apparatus for seaming substantially the entire peripheral edges of glass sheets precut to their desired outline.

The apparatus of this invention finds particular use in the production of laminated automotive windshields, or the like, wherein, for example, pairs of glass sheets are cut to matching outlines, washed, dried and each pair is stacked on a bending mold for transport through a tunnel-like lehr where the glass is bent to the desired shape. After bending the sheets of each pair are separated and a sheet of thermoplastic material is inserted as an interlayer therebetween to form a glass-plastic sandwich assembly. This latter assembly is then laminated, with heat and pressure, to form the ultimate product to be installed in a frame to serve as an automotive windshield, or the like.

Unless the edges of the cut glass sheets are seamed, the edges remain so sharp that operating personnel and others handling the sheets, such as those who install the ultimate product, are likely to be cut. Seaming by moving an abrasive surface against the edge of the precut sheets has been found to eliminate the sharp edges. The present invention is concerned with improved apparatus for effecting such seaming, being so constructed and arranged to seam substantially the entire peripheral edge of a precut glass sheet.

In a typical embodiment of the present invention an edge seaming apparatus is provided for use along a horizontal line for conveying matched glass sheets along parallel paths from a cutting station to a washing station. Such typical apparatus includes two pairs of overhead tracks extending transversely above the horizontal conveyor normally employed for transporting the matched glass sheets along spaced parallel paths, a pair of carriages mounted for movement along each pair of overhead tracks, stop means for setting the initial position of each carriage along the overhead tracks, a pulley system pivoted to each carriage for rotation about a vertical axis, each pulley system comprising a driving pulley and a driven pulley, an abrasive belt traversing the horizontal plane of the conveyor and interconnected between the pulleys, and means to initially angularly position the pulley systems. Each carriage and pulley system is counterweighted to lightly urge its associated abrasive belt into continuous engagement with a portion of the edge of a glass sheet moving along one of the parallel paths, and, also, to position the abrasive belt for treating the next conveyed sheet moving along the path. Each pulley system is provided with freely rotatable guide rolls which flank the glass engaging run of the abrasive belt to contact the edges of the moving glass sheets, thus preventing overgrinding of the edges of the glass sheets and to properly position the abrasive belt for following the contour of and engaging the edges of the glass sheets. The stop means for initially setting the position of each carriage also prevents interference between adjacent pulley systems. Pinch rolls are included near each seaming station to impart a positive drive to the glass sheet passing therethrough, and upstanding freely rotatable rollers adjacent the pinch rolls keep the sheets aligned with their desired paths of movement.

A typical embodiment of the present invention will be described for purposes of illustration rather than limitation. In the drawings which form part of the description of this embodiment and wherein like reference numerals refer to like structural elements;

Fig. 3 is an enlarged side view of one of the edge seaming means;

Fig. 4 is a view of one of the edge seaming means taken at right angles to Fig. 3 with parts not shown;

Fig. 5 is a view illustrating fixed and adjustable stop means for initially angularly positioning the edge seaming means relative to its carriage and illustrating a second position of the stop means; and Fig. 6 is a schematic plan view of the apparatus of this invention showing precut glass sheets conveyed through the seaming station and showing the various positions of the edge seaming means in a complete operation.

Figure 1:
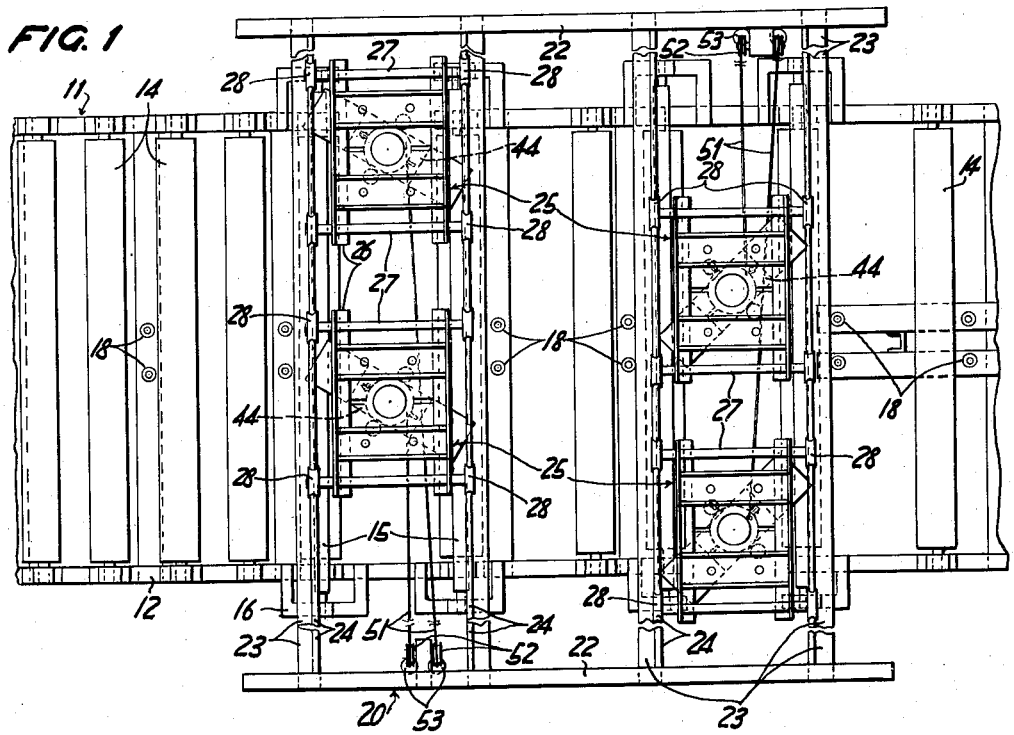
Fig. 1 is a plan view of a typical edge seaming installation and its relation to a conveyor for transporting precut glass sheets from a cutting station to a washing station.
Figure 2:
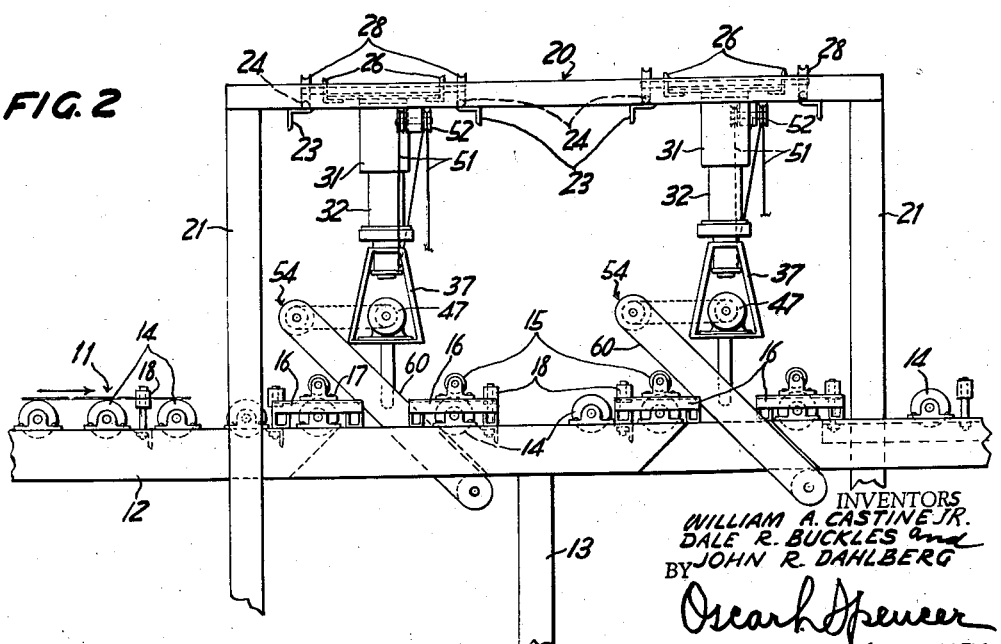
Fig. 2 is a side view of the apparatus illustrated in Fig. 1 with the edge seaming means turned slightly for ease of viewing and explanation.

Referring to the drawings, and especially Figs. 1 and 2, a horizontal conveyor, generally identified by 11 is supported on longitudinally extending horizontal beams 12 carried by a supporting structure 13. The horizontal conveyor includes conveyor rolls 14 and pinch rolls 15. The conveyor rolls 14 are driven by means of a conventional driving means including a motor (not shown). The rolls 15 are arranged in vertical relation to certain conveyor rolls 14 within pinch roll housing 16 and are adjustable toward and away from their vertically aligned conveyor rolls 14 by means of control adjustment 17. A plurality of vertically disposed freely rotatable rollers 18 are provided, as illustrated, for maintaining a predetermined path of travel of the glass sheets and to prevent engagement of the parallel moving glass sheets while passing through the seaming station.

The seaming apparatus, generally identified as 20, includes, in the preferred embodiment, four seaming devices S-1, S-2, S-3 and S-4, each of which is identical in construction. The seaming apparatus 20 is supported on vertical braces 21 interconnected by horizontal beams 22 extending longitudinally of the conveyor 11. Spaced angle members 23 extend transversely above the conveyor 11 and interconnect the longitudinally extending beams 22. Each angle member 23 has a rod 24 connected to its upper surface, which rods 24 form rails for mounting carriages, generally identified as 25, for limited movement along a pair of adjacent rails. Each carriage 25, of which there are four, one for each seaming device, includes a rectangular framework 26 carrying axles 27 on which wheels 28 are mounted, which wheels roll along the rails 24. Stop means 30 (see Fig. 3) adjustably positioned along the rails 24 limit the movement of the carriages 25, as will later be explained. As each of the seaming devices is identical in construction, one description will suffice.

A bracket 31 is bolted or otherwise suitably connected to the carriage framework 26 and a cylindrical member 32 is fixedly attached to the bracket as by welding. The member 32 terminates, at both ends, in cylindrical flanges 33 and 34 which receive upper and lower bearings 35 and 36, respectively. Bearings 35 and 36 are preferably of the tapered roller variety, or the like. A framework 37 is rotatably connected to the framework 26 by means of a threaded rod 38 passing through the member 32 and being journaled in the bearings 35 and 36. A lock nut 40 engages the upper terminal end of the rod 38 and a threaded sleeve 41 having a flanged collar 42 at its lower terminal end engages the lower terminal end of the rod 38. A collar or washer 43 is interposed between the lower bearing 36 and the framework 37.

The framework 37 includes an upper platform 44 and a lower platform 45, the upper platform having an upstanding stop member 46 connected thereto and the lower platform forming a support for an electric motor 47. A split ring 48 surrounds the lower flange 36 and has a stop member 49 fixedly connected thereto. The ring 48 is joined by means of a nut and bolt 50 and is arranged for adjustment about the stationary flange 34 for varying the location of the stop member 49 relative to the flange 34. The stop members 46 and 49 cooperate to initially angularly position the seaming device relative to the carriage 25, as will be explained below. A cable 51 is connected to the periphery of the flanged collar 42 and passes over a pulley 52 mounted on the horizontal beam 22. A counterweight 53 is attached to the cable 51 at its terminal end. As is obvious, the counterweight 53 provides a force tending to rotate the frame 37, such rotation being limited by engagement of the stop members 46 and 49.

A pulley assembly 54 is fixedly connected by brackets 55 and 56 to the framework 37. The pulley assembly 54 which is angled at approximately 45 degrees from the vertical includes a drive pulley 57 and a driven pulley 58, the pulleys 57 and 58 being interconnected by an abrasive belt 60. A belt drive connects the motor 47 and the pulley 57 for driving the abrasive belt 60. The pulleys 57 and 58 are maintained in spaced relation by means of a belt tightener 61.

In order to prevent excess seaming along an edge of a glass sheet and to provide a means whereby the seaming abrasive belt 60 follows the contour of the glass sheets G, guide rolls 62 are mounted for free rotation about bearing rods 63 fixed to a bracket 64 attached to each belt tightener 61. The guide rolls 62 flank the glass engaging run of the belt 60.

The belt tightener 61 prevents too much slack in the abrasive belt 60 by insuring that the driven pulley 58 is maintained a maximum distance from the driving pulley 57. The driven pulley 58 is mounted on a bearing rod carried by a yoke 66, fastened to the bottom of a tube 67, the upper portion of the tube 67 being surrounded by a sleeve 68. The sleeve 68 is connected to a yoke 69 carrying a bearing rod on which the driving pulley 57 is mounted. A bearing collar 70 surrounds the bottom of the sleeve 68. A pin 71 is fixed across and through the tube 67 and is vertically movable in vertical slots 72 in diametrically opposite portions of the sleeve 68, the bearing collar 70 defining the lower extent of the slots 72.

Above the tube 67 and within the upper portion of the sleeve 68 is a spring 73 compressed between an upper plug 74 and a lower plug 75, which plugs fit into the sleeve 68. The lower plug 75 abuts the top of the tube 67. An adjusting screw 76 threaded through a fixed support plate 77 within the sleeve 68 contacts the upper plug 74 and by rotation of the screw the setting of the upper plug 74 and the tension of the spring 73 is changed. The tension supplied to the abrasive belt 60 thus is a function of the setting of the adjusting screw 76. The limits of adjustment of the belt tightener 61 are defined by the length of the slots 72.

Turning now to Fig. 6, a description of a typical edge seaming operation will be given. There are precut glass sheets G-1 and G-2 traveling in the direction of the arrows from a cutting station to a washing station through the edge seaming aparatus 20. As explained previously, a positive drive is imparted to the glass sheets by means of pinch rolls and their parallel paths are maintained by means of freely rotatable vertically disposed rollers, the pinch rolls and rollers not being illustrated in Fig. 6. The glass sheets G-1 and G-2 which travel in pairs through the edge seaming station are a matched pair for later assembly into a laminated structure.

As illustrated, there are four edge seaming devices in the apparatus 20, the four edge seaming apparatus being identified as S-1, S-2, S-3 and S-4. Edge seaming devices S-1 and S-2 are provided for edge seaming the sheet of glass G-1, and edge seaming devices S-3 and S-4 are provided for edge seaming the parallel traveling sheet of glass G-2. Edge seaming devices S-1 and S-3 are effective to edge seam an edge portion of each of the glass sheets extending longitudinally from adjacent one longitudinal extremity to adjacent the other longitudinal extremity. Edge seaming devices S-2 and S-4 are effective to edge seam the opposite edge portions of the glass sheets. Thus, the combination of edge seaming devices S-1 and S-2 or S-3 and S-4 are effective to edge seam substantially the entire peripheral edge of a sheet of glass. The only portion of the edge not seamed is that immediately adjacent the longitudinal extremities of the sheets. In actual practice the entire peripheral edge of the sheet of glass is seamed with the exception of portions extending 3 to 6 inches from the longitudinal extremities.

Edge seaming devices S-1 and S-3 are initially angularly adjusted so that their belts 61 form an angle with the longitudinal path of travel of a glass sheet substantially equal to the angle that the leading edge of the glass sheet makes with its path of travel. These devices are adjusted transversely of the conveyor so that the initial engagement of the belt 61 with the glass occurs immediately adjacent the longitudinal extremity of the sheet. The angular adjustment of the devices is effected by adjusting the split ring 48 relative to the stationary collar 34, while the transverse adjustment is provided by positioning the stop 30 to a desired location on a rail 24. Properly adjusted for angular initial engagement with the glass, the stops 46 and 49 will engage one another. As the moving glass sheets engage the belts 61 of the devices S-1 and S-3, which belts are being driven by means of the pulley systems 54 and the motors 47, the guide rolls 62 of each device will initially engage the edge of the glass sheet being seamed. As the glass sheets are advanced through the seaming station by means of the pinch rolls, each edge seaming device operating on a sheet of glass follows the contour of the glass sheet, thus entailing both transverse change of position and angularity change. The transverse change in position is allowed by the carriage 25 moving on the tracks 24. The angularity change is provided by the device being rotatable with respect to the carriage 25 and by means of the guide rolls 62 engaging and following the edge of the glass sheet. Each edge seaming belt 61 is constantly urged into engagement with the edge of the sheet by means of the counterweight 53. When the glass is conveyed past an edge seaming device, the device returns to its initial position. This return to initial position is effected by means of the counterweight 53 acting on the collar 42 and causing rotation of the frame 37 and its connected parts. Rotation is effected until the stops 46 and 49 are in engagement. The counterweight also causes the carriage 25 to return to the position where it contacts the stop member 30.

The same sequence of steps occurs at the following edge seaming devices S-2 and S-4 with the devices S-2 and S-4 edge seaming the opposite edge portions of the glass sheets.

If desired, the edge seaming station could be constructed of one pair of edge seaming devices, such as S-1 and S-2 or S-3 and S-4, in which case, the conveyor would be constructed to transport only one sheet of glass at a time into the apparatus.

The devices illustrated and described are not limited to use on the particular shaped precut glass sheets illustrated for purposes of description because they may be adjusted for edge seaming substantially all contours of glass sheets.

Several modifications in the structure described may be made without departing from the spirit of the invention. For example, other means of mounting the carriage and returning it to its initial position will be apparent to one skilled in the art.

If desirable, an additional edge seaming station may be provided with the abrasive belts transposed through an angle of 90°. Such additional station would follow, in tandem the edge seaming station shown. Such additional edge seaming station would further seam the top edge of the precut glass sheets.

We claim:

1. Apparatus for edge seaming substantially the entire peripheral edge of a precut contoured flat glass sheet having spaced edge portions converging at its longitudinal extremities adapted for use as an automotive windshield or the like comprising, a horizontal conveyor for transporting the precut flat glass sheet, a seaming station comprising a pair of spaced tracks extending transversely of and spaced from said conveyor, a carriage mounted for movement along each track, a pulley system pivoted to each carriage for rotation about a vertical axis, each pulley system including a driving pulley and a driven pulley, an abrasive belt traversing the horizontal plane of the conveyor and interconnected between said pulleys, means to initially position each pulley system so that its abrasive belt engages the edge of the glass sheet at a predetermined location along said edge, means causing each pulley system to follow the contour of the glass sheet edge and to disengage said edge at a predetermined location, means to return each carriage to said initial position after an edge seaming operation, and means to drive each pulley system.

2. Apparatus for edge seaming substantially the entire peripheral edge of a precut contoured flat glass sheet having spaced edge portions converging at its longitudinal extremities adapted for use as an automotive windshield or the like comprising, a horizontal conveyor for transporting the precut flat glass sheet, a seaming station comprising a pair of spaced tracks extending transversely of and spaced from said conveyor, a carriage mounted for movement along each track, a pulley system pivoted to each carriage for rotation about a vertical axis, each pulley system including a driving pulley and a driven pulley, an abrasive belt traversing the horizontal plane of the conveyor and interconnected between said pulleys, means to initially position each pulley system transversely of said conveyor so that its abrasive belt engages the edge of the glass sheet at a predetermined location along said edge, means to initially angularly position each pulley system relative to its carriage so that the width of its abrasive belt fully engages the edge of the glass sheet at the initiation of the edge seaming operation, means causing each pulley system to follow the contour of the glass sheet edge and to disengage said edge at a predetermined location, means to return each carriage to said initial position after an edge seaming operation, means to return each pulley to said initial angular position after an edge seaming operation, and means to drive each pulley system.

3. Apparatus as recited in claim 2, wherein the means to initially position each pulley system transversely of said conveyor includes a stop member slideable along a track and means to fix said stop member in a desired position, said stop member limiting the transverse movement of a carriage in one direction.

4. Apparatus as recited in claim 2, wherein said means to initially angularly position each pulley system relative to its carriage includes a pair of stop members, one stop member being adjustably fixed with respect to the carriage and the other stop member being fixed with respect to the pulley system, and means to urge said stop members into engagement.

5. Apparatus as recited in claim 4, wherein said means to urge said stop members into engagement includes a counterweight connected to said pulley system.

6. Apparatus as recited in claim 2, wherein said means to return each carriage to said initial position includes a counterweight connected to the pulley system.

7. Apparatus as recited in claim 2, wherein said means to return each pulley system to its initial angular position includes a counterweight connected to each pulley system.

References Cited in the file of this patent

UNITED STATES PATENTS

| | | |
|---|---|---|
| 732,767 | Metzner | July 7, 1903 |
| 1,264,930 | Heim | May 7, 1918 |
| 1,396,585 | Laird | Nov. 8, 1921 |
| 2,725,691 | Sommer et al. | Dec. 6, 1955 |
| 2,795,086 | Clark | June 11, 1957 |